(12) United States Patent
Sato et al.

(10) Patent No.: US 7,905,537 B2
(45) Date of Patent: Mar. 15, 2011

(54) HARNESS INSTALLATION STRUCTURE OF LINK-TYPE MOVABLE BODY

(75) Inventors: Kunihiko Sato, Kosai (JP); Takehiko Uehara, Toyota (JP)

(73) Assignee: Yazaki Corporation, Tokyo (JP)

( * ) Notice: Subject to any disclaimer, the term of this patent is extended or adjusted under 35 U.S.C. 154(b) by 744 days.

(21) Appl. No.: 11/645,740

(22) Filed: Dec. 27, 2006

(65) Prior Publication Data

US 2007/0148994 A1 Jun. 28, 2007

(30) Foreign Application Priority Data

Dec. 27, 2005 (JP) .................................. 2005-374688
Oct. 11, 2006 (JP) .................................. 2006-277163

(51) Int. Cl.
*B60J 5/00* (2006.01)
(52) U.S. Cl. .................................. 296/146.12; 174/101
(58) Field of Classification Search ............. 296/146.11, 296/146.12, 155; 174/101
See application file for complete search history.

(56) References Cited

U.S. PATENT DOCUMENTS

| 3,848,361 | A | * | 11/1974 | Foster et al. ..................... 49/167 |
| 5,879,047 | A | | 3/1999 | Yamaguchi et al. |
| 6,070,931 | A | * | 6/2000 | Yamaguchi et al. ........ 296/146.7 |
| 6,844,497 | B2 | * | 1/2005 | Frantz et al. ................. 174/72 A |
| 2006/0170244 | A1 | * | 8/2006 | Blase ............................ 296/155 |

FOREIGN PATENT DOCUMENTS

| DE | 19948852 | * | 8/2001 |
| JP | 10-175483 A | | 6/1998 |
| WO | 2005/010400 A1 | | 2/2005 |

OTHER PUBLICATIONS

China Office Action dated Oct. 31, 2008.

* cited by examiner

*Primary Examiner* — Dennis H Pedder
(74) *Attorney, Agent, or Firm* — Sughrue Mion, PLLC

(57) ABSTRACT

A harness installation structure, includes a link arm that pivotally supports a movable body to a fixed body; a wire harness that is installed to extend from the fixed body to the movable body along the link arm. The wire harness has an upwardly-extending portion which is arranged to extend vertically upwardly at an end portion of the link arm. The upwardly-extending portion is twisted in its peripheral direction while the movable body is moved between an opened position and a closed position.

5 Claims, 10 Drawing Sheets

HARNESS INSTALLATION STRUCTURE OF LINK-TYPE MOVABLE BODY

BACKGROUND OF THE INVENTION

This invention relates to a harness installation structure of a link-type movable body, in which the movable body such for example as a door of an automobile is supported by a link so as to be opened and closed, and a power supply wire harness is installed along the link, and is arranged to extend vertically upwardly, and these upwardly-extending portions are twisted when the door is opened and closed.

FIG. 11 shows a related harness installation structure of a link-type movable body (see JP-A-10-175483 (FIGS. 5 and 9)).

This link-type movable body is a link-type door 62, and the link-type door 62 is swingably supported on a vehicle body 70 by a single support arm 71 of a generally L-shape. The support arm 71 has a high rigidity so as to support the weight of the door 62.

Besides the support arm 71, a pair of front and rear link arms 66 and 65 are provided in parallel relation to each other, and each of the link arms 65 and 66 is pivotally supported at its proximal end on the vehicle body 70, and also is pivotally supported at its distal end on a slider 64. The slider 64 is slidably engaged in a horizontal guide rail 63 mounted on the door.

There is provided a harness support structure in which a wire harness 68 extending from the vehicle body is installed horizontally along an outer surface of the front link arm 66, an is fixed to the link arm 66 by a holder 72, and one side portion of the wire harness 68, while bent in a generally U-shape or a generally J-shape, extends along a caterpillar-like exterior member 69 provided in continuous relation to the slider 64 within the guide rail on the door, and is introduced into the door, and is connected to auxiliary equipments and electrical equipments within the door. The other side portion 68a of the wire harness 68 is installed to be slightly bent toward the vehicle body 70, and is connected to a power source. In FIG.11, the right side is the front side of the vehicle.

Examples of the auxiliary equipments include a power window motor, a door lock unit, a speaker and a door opening/closing drive device. In order to continuously supply electric power to these auxiliary equipments, the link arms 65 and 66, the guide rail 63, the slider 64 and the exterior member 69 are used as a mechanism for absorbing an opening/closing stroke of the door 62. The exterior member 69 is received in a receiving case 67 disposed beneath the guide rail 63.

When the door 62 is fully closed, the support arm 71 and the link arms 65 and 66 are extended forward, and the slider 64 moves toward a front end of the guide rail 63, and the one side portion of the wire harness 68 is received in the receiving case 67 through a bending action of the exterior member 69. The wire harness 68 is turned together with the link arm 66.

When fully opening the door 62, the link arms 65 and 66 maintains a door half-opened condition shown in FIG. 11, and the support arm 71 is extended rearward, and the slider 64 moves toward a rear end of the guide rail 63, and the wire harness 68, together with the exterior member 69, is drawn out rearward long.

However, in the above related harness installation structure of the link-type movable body, in addition to the support arm 71, the pair of link arms 65 and 66 are required, and therefore there has been encountered a problem that the structure is complicated and costly. And besides, in order to absorb a surplus length of the wire harness 68, the guide rail 63, the slider 64, the caterpillar-type exterior member 69, etc., need to be provided, and this has invited a problem that the structure is further complicated and costly. Furthermore, when the door 62 is opened and closed, the surplus length portion 68a of the wire harness 68 is loosened to be bent, and is pulled at a proximal end portion 66a (at the vehicle body 70) of the link arm 66, and therefore not only the surplus length must be absorbed at the door side, but also care must be taken so that the wire harness 68 will not be caught by the link arm 66 or others at the vehicle body side (Namely, management points exist both at the door side and the vehicle body side). Therefore, the design, management, etc., for positively effecting the continuous supply of electric power are very difficult, and besides a space for allowing the bending of the surplus length portion 68a of the wire harness 68 is required, and therefore there has been encountered a problem that the degree of freedom of arrangement of the vehicle body-side parts, etc., may be limited.

Even in the case where the above harness installation structure of the link-type movable body is applied to other movable body than the automobile door, there has been a fear that similar problems as described above arise.

SUMMARY OF THE INVENTION

With the foregoing in view, it is an object of this invention to provide a harness installation structure of a link-type movable body in which the structure can be simplified, and can be formed into a low-cost design, and besides the number of management points for a surplus length of a wire harness can be reduced, and furthermore a space required for the bending of the wire harness at a fixed body-side can be saved.

The above object has been achieved by a harness installation structure, comprising:

a link arm that pivotally supports a movable body to a fixed body;

a wire harness that is installed to extend from the fixed body to the movable body along the link arm, wherein the wire harness has an upwardly-extending portion which is arranged to extend vertically upwardly at an end portion of the link arm; and wherein the upwardly-extending portion is twisted in its peripheral direction while the movable body is moved between an opened position and a closed position.

Preferably, the upwardly-extending portion is arranged at an axis of a shaft portion provided on the end portion of the link arm or in the vicinity of the shaft portion.

With the above construction, the upwardly-extending portions of the wire harness are twisted in the peripheral direction at the longitudinally-opposite end portion of the link arm in accordance with the opening and closing of the movable body, so that the pivotal movement of the link arm is absorbed. Thanks to the provision of the two upwardly-extending portion, the surplus length portion (that is, the portion which is bent so as to absorb a surplus length) of the related wire harness becomes unnecessary. The link arm may be one, or two or more link arms may be provided. In the case where the axis of the shaft portion (about which the link arm can be pivotally moved) provided respectively at the end portion of the link arm coincide respectively with the axis of the upwardly-extending portion, tension and compression will not act on the wire harness. In the case where the upwardly-extending portion is disposed in the vicinity of the shaft portion, a small pulling force and a small compressive force act on the wire harness. However, the vertically upwardly-extending portion is slightly inclined, thereby absorbing this pulling force and compressive force (The upwardly-extending portion is twisted in the peripheral direction in a slightly inclined condition.). The link arm serves to support the movable body (The weight of the movable body is supported only by the link arm.), and also serves to provide a path of installation of the wire harness.

The harness installation structure includes a protector that is provided on the link arm. The wire harness passes through the protector. The upwardly-extending portion is formed at a part of the wire harness drawn from an end of the protector.

With the above construction, the wire harness within the protector is safely protected from interference with the exterior. In the case where the protector is mounted on the link arm in axis-offset relation thereto, and the upwardly-extending portions of the wire harness are disposed in the vicinities of the shaft portions, respectively (The axes of the shaft portions of the link arm are slightly offset respectively from the axes of the upwardly-extending portions of the wire harness.), a compressive force and a pulling force act on the wire harness in accordance with the pivotal movement of the link arm. In this case, however, the wire harness is expanded and contracted in a meandering manner within the protector, thereby absorbing the compressive force and pulling force.

Preferably, the protector is a slide protector. Expansion and contraction of the wire harness due to axis offset between the link arm and the slide protector are absorbed by expansion and contraction of the slide protector.

With the above construction, the slide protector, together with the wire harness received therein, is expanded at the time of opening of the movable body, and is compressed at the time of closing of the movable body, and therefore a large compressive force and a large pulling force will not act on the two upwardly-extending portions of the wire harness, and the twisting movement of each upwardly-extending portion is effected smoothly and positively. As the slide protector, there can be used, for example, the type of protector comprising an outer protector and an inner protector. The outer protector is fixed to the link arm, and the inner protector, together with the wire harness, slides within the outer protector.

Preferably, the upwardly-extending portion of the wire harness passes through a hole formed in an upper wall of a panel provided at the fixed body.

With this construction, the upwardly-extending portion of the wire harness has a length larger than a height of the rocker panel, and since the upwardly-extending portion has the increased length, the amount of change of the harness length due to the twisting operation (that is, the amount of absorbing of a surplus length) is increased, and therefore the relief of stresses, that is, the absorption of the harness surplus length, is positively effected by the twisting movement of the fixed body-side upwardly-extending portion at the time of opening and closing the movable body.

Preferably, the wire harness passes through a hole formed in a side wall of a panel provided at the fixed body. The upwardly-extending portion of the wire harness passes through a hole formed in a floor panel.

With this construction, the upwardly-extending portion of the wire harness has a length larger than a height of the rocker panel and also than a height from the hole of the rocker panel to the floor panel, and since the upwardly-extending portion has the increased length, the amount of change of the harness length due to the twisting operation (that is, the amount of absorbing of a surplus length) is increased, and therefore the relief of stresses, that is, the absorption of the harness surplus length, is positively effected by the twisting movement of the fixed body-side upwardly-extending portion at the time of opening and closing the movable body.

Preferably, the harness installation structure includes a waterproof grommet which is fitted in the hole of the panel and the hole of the floor panel. The upwardly-extending portion is installed within the waterproof grommet.

With this construction, the upwardly-extending portion of the wire harness, disposed within the elastic waterproof grommet, is safely protected from interference with the exterior and also from rain water, etc. Preferably, the waterproof grommet is connected to the link arm-side protector (slide protector). The waterproof grommet is flexibly bent in accordance with the pivotal movement of the link arm. At the same time, the upwardly-extending portion is twisted within the waterproof grommet.

Preferably, the movable body is a door, and the fixed body is a vehicle body.

With the above construction, in the harness installation structure of the link-type movable body, similar effects and advantage as described above can be achieved in the arrangement in which the movable body and the fixed body are replaced respectively by the door and the vehicle body.

In the above configuration, the upwardly-extending portions of the wire harness are twisted in the peripheral direction respectively at the opposite end portions of the link arm, thereby absorbing the pivotal displacement of the link arm. Therefore, a surplus length portion of the wire harness does not need to be provided, and a management point for a surplus length of the wire harness is eliminated, and the reliability of the continuous power supply is enhanced, and a space required for the bending of a surplus length portion is eliminated, so that the degree of freedom of layout of the movable body-side parts, fixed body-side parts, etc., is enhanced. Furthermore, the link arm serves to support the movable body, and also serves to install the wire harness, and therefore the structure is simplified, and is formed into the low-cost design.

In the above configuration, in the case where the protector is mounted on the link arm in axis-offset relation thereto, the compression and tension of the wire harness within the protector are smoothly absorbed without interference with the exterior, and therefore the absorbing operation by the twisting of the upwardly-extendihg portions is effected smoothly and positively, and the reliability of the continuous power supply is further enhanced.

In the above configuration, in the case where the protector is mounted on the link arm in axis-offset relation thereto, the compression and tension of the wire harness are smoothly absorbed by the slide protector, and therefore the absorbing operation by the twisting of the upwardly-extending portions is effected more smoothly and positively, and the reliability of the continuous power supply is still further enhanced.

In the above configuration, the upwardly-extending portion of the wire harness can be made long at the fixed body, and the harness surplus length is positively absorbed by the twisting of the upwardly-extending portion, and also the amount of absorbing of the harness surplus length increases.

In the above configuration, the upwardly-extending portion of the wire harness can be made long at the fixed body, and the harness surplus length is positively absorbed by the twisting of the upwardly-extending portion, and also the amount of absorbing of the harness surplus length increases.

In the above configuration, the upwardly-extending portion of the wire harness, disposed within the waterproof grommet, is safely protected by this grommet, and therefore the reliability of a continuous power supply is enhanced.

In the above configuration, a surplus length of the wire harness can be positively absorbed in a narrow space of the vehicle when the door is opened and closed, and the space-saving design for the harness installation portion of the vehicle is achieved.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
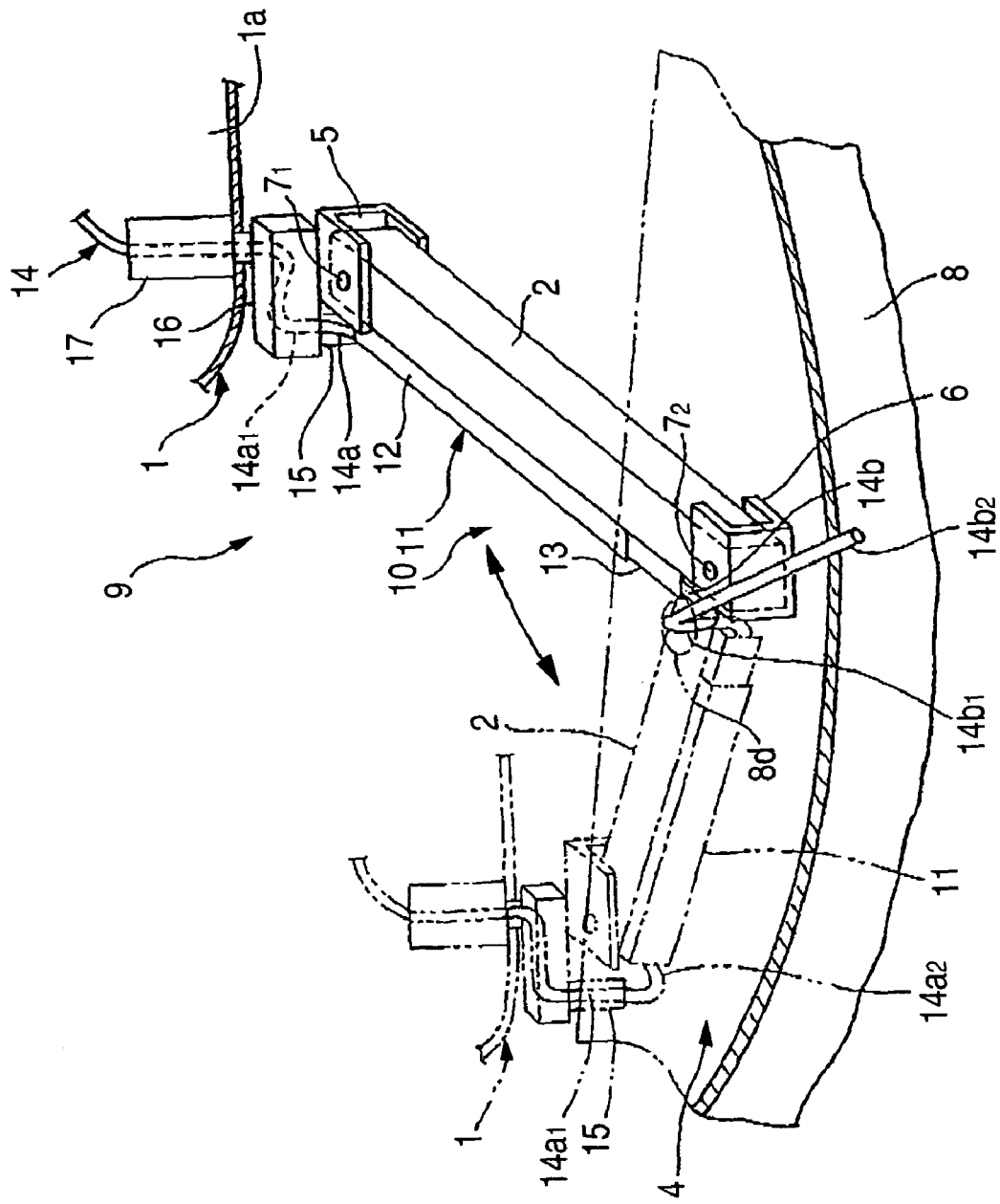
FIG. 1 is a perspective view showing a rough example of a harness installation structure of a link-type movable body provided in accordance with the present invention.

FIG. 1 shows a rough example of a harness installation structure of a link-type movable body embodying the present invention.

This link-type movable body is a link-type door 1 of an automobile, and the link-type door 1 is swingably (pivotally) supported on a vehicle body 4 by a link arm 2. The link arm 2 is made of a metallic material such as iron and an aluminum alloy, and has high strength and rigidity. Incidentally, another link arm (not shown) can be provided above the link arm 2 in opposed relation thereto, or another link arm (not shown) can be provided forwardly or rearwardly of the link arm 2 in parallel relation thereto, or besides the link arm 2, a guide rail (not shown) can be used to support the door 1.

A distal end portion of the link arm 2 is pivotally supported on a door (movable body)-side link bracket 5 by a shaft portion 7 ($7_1$), and a proximal end portion of the link arm 2 is pivotally supported on a vehicle body (fixed body)-side link bracket 6 by a shaft portion 7 ($7_2$). The link brackets 5 and 6 are disposed parallel to each other, and the link arm 2 and the pair of left and right link brackets 5 and 6 jointly form a link mechanism. The vehicle body-side link bracket 6 is provided at the inner side of a rocker panel 8. In the case where a pair of front and rear link arms are used, the pair of link arms are interconnected by a pair of left and right long link brackets.

In FIG. 1, the left side is a front side of the vehicle, while the right side is a rear side of the vehicle. In FIG. 1, solid lines indicate a fully-open condition of the door 1, while dots-and-dash lines indicate a fully-closed condition of the door 1. When the door 1 is fully opened, the door 1 is projected outwardly from the vehicle body 4, and is moved rearward in offset relation to the vehicle body 4, so that an entrance/exit opening 9 is formed at the front side of the door 1, and a space 10 is formed between the door 1 and the vehicle body 4. When the door 1 is fully closed, the link arm 2 is turned forward, so that the door 1 is brought into intimate contact with the vehicle body 4. When the door 1 is opened and closed, the link arm 2 is swung, and the link brackets 5 and 6 are always kept parallel to each other.

A slide protector 11 made of a synthetic resin is mounted on an outer surface (front side surface) of the link arm 2 in parallel relation thereto. The slide protector 11 comprises an outer protector 12 of a rectangular tubular shape, and an inner protector 13 one size smaller in width than the outer protector 12. The outer protector 12 is disposed near to the door 1, and is immovably fixed to the link arm 2, while the outer protector 13 is disposed near to the vehicle body 4, and can slide within the outer protector 12.

A wire harness (comprising a plurality of insulated round wires) 14 is passed through the slide protector, and one side portion 14*a* of the wire harness 14 is led out of a distal end of the outer protector 12 toward the door 1, and the other side portion of the wire harness 14 is led out of a distal end of the inner protector 13 toward the vehicle body. The wire harness 14 is fixed to the inner protector 13, but is not fixed to the outer protector 12.

The one side portion 14*a* of the wire harness 14 extends vertically upwardly in the vicinity of the shaft portion $7_1$ of the link arm 2, for example, along a door-side protector 15 (shown in FIG. 2) (This upwardly-extending portion is designated by reference numeral $14a_1$.), and further is installed horizontally along a horizontally-extending protector 16 (shown in FIG. 1) (This horizontally-extending portion is designated by reference numeral $14a_2$.), and is led out of an upper side of the protector 16, and passes through a waterproof grommet 17 of an elastic nature, and is installed at an inner side of a door inner panel 1*a*. The two protectors 15 and 16 can be formed integrally with each other to serve as a protector portion.

Figures 2A, 2B:
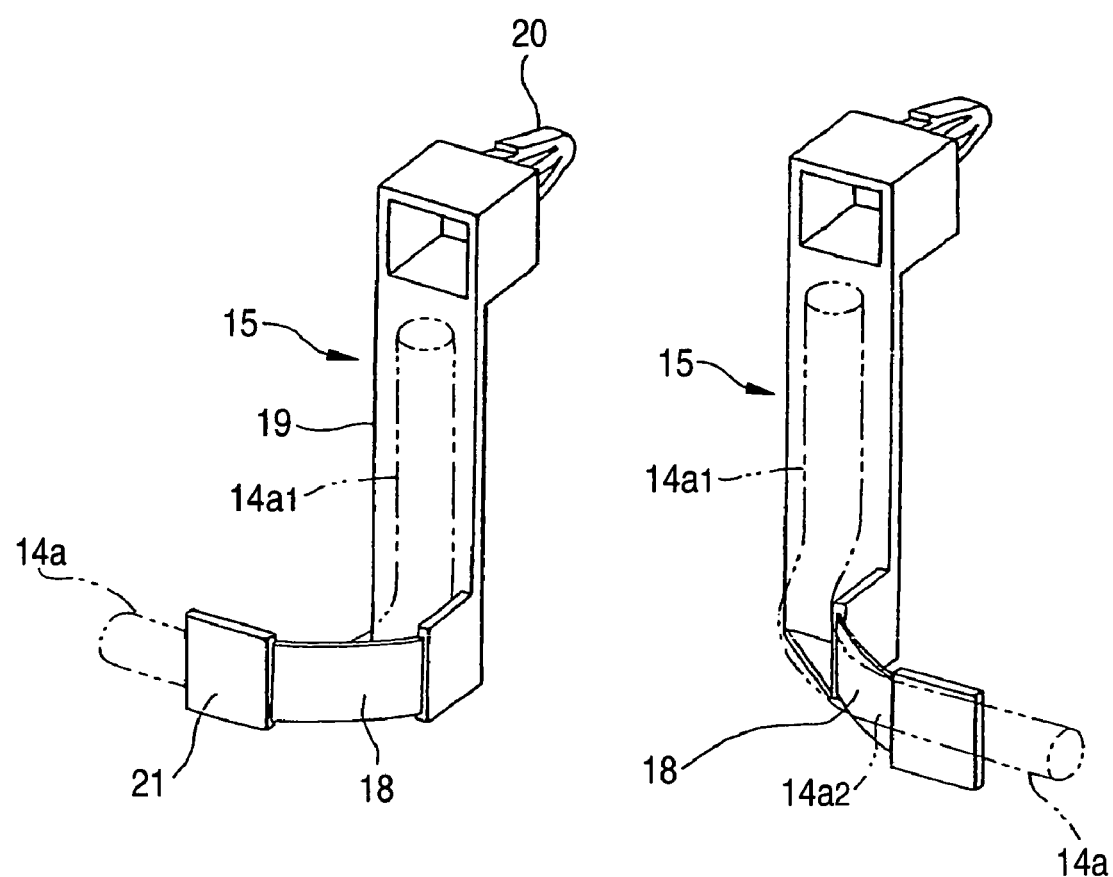
FIGS. 2A and 2B are perspective views of one example of a movable body-side protector used in the harness installation, showing the sequence of its operation.

The protector 15 of FIGS. 2A and 2B is made of a synthetic resin, and includes a horizontally-disposed flexible plate portion (flexible portion) 18, a vertical plate portion 19 extending upwardly perpendicularly from the flexible plate portion 18, and a retaining clip 20 (for being fixed to the door) formed at an upper end portion of the vertical plate portion 19.

The one side portion 14*a* of the wire harness 14 is fixed horizontally to a plate portion 21, formed at a distal end of the flexible plate portion 18, by winding a tap or by a band, and is bent at an angle of 90 degrees, and extends upwardly along the vertical plate portion 19 (The upwardly-extending portion is designated by reference numeral $14a_1$.). In accordance with the opening and closing of the door 1, the wire harness 14 swings together with the flexible plate portion 18 as shown in FIGS. 2A and 2B, and also the upwardly-extending portion $14a_1$, extending along the vertical plate portion 19, is twisted in its peripheral direction (that is, twisted generally about an axis thereof in the vicinity of the shaft portion $7_1$ of the link arm 2 to respond to the pivotal movement of the link arm 2 (that is, to absorb looseness of the wire harness resulting from the pivotal movement). At the protector 15 of FIGS. 2A and 2B, the wire harness 14 is firmly fixed without looseness, and will not form any surplus length portion when the door is opened and closed.

In FIG. 1, the other side portion 14b of the wire harness 14 horizontally projects a short distance from the slide protector 11 toward the rocker panel 8 of the vehicle body 4, and extends vertically upwardly in the vicinity of the shaft portion $7_2$ of the link arm 2 (This upwardly-extending harness portion is designated by reference numeral $14b_1$.), and passes through a hole 8d in the rocker panel 8, and is bent at an angle of 90 degrees to be directed toward the vehicle body 4, and is installed horizontally (This horizontal harness portion is designated by reference numeral $14b_2$.). When the door is opened and closed, the upwardly-extending portion $14b_1$ is twisted in its peripheral direction to absorb the pivotal movement of the link arm 2. The operation of the vehicle body-side upwardly-extending portion $14b_1$ is similar to the operation of the door-side upwardly-extending portion $14a_1$.

Figure 3:
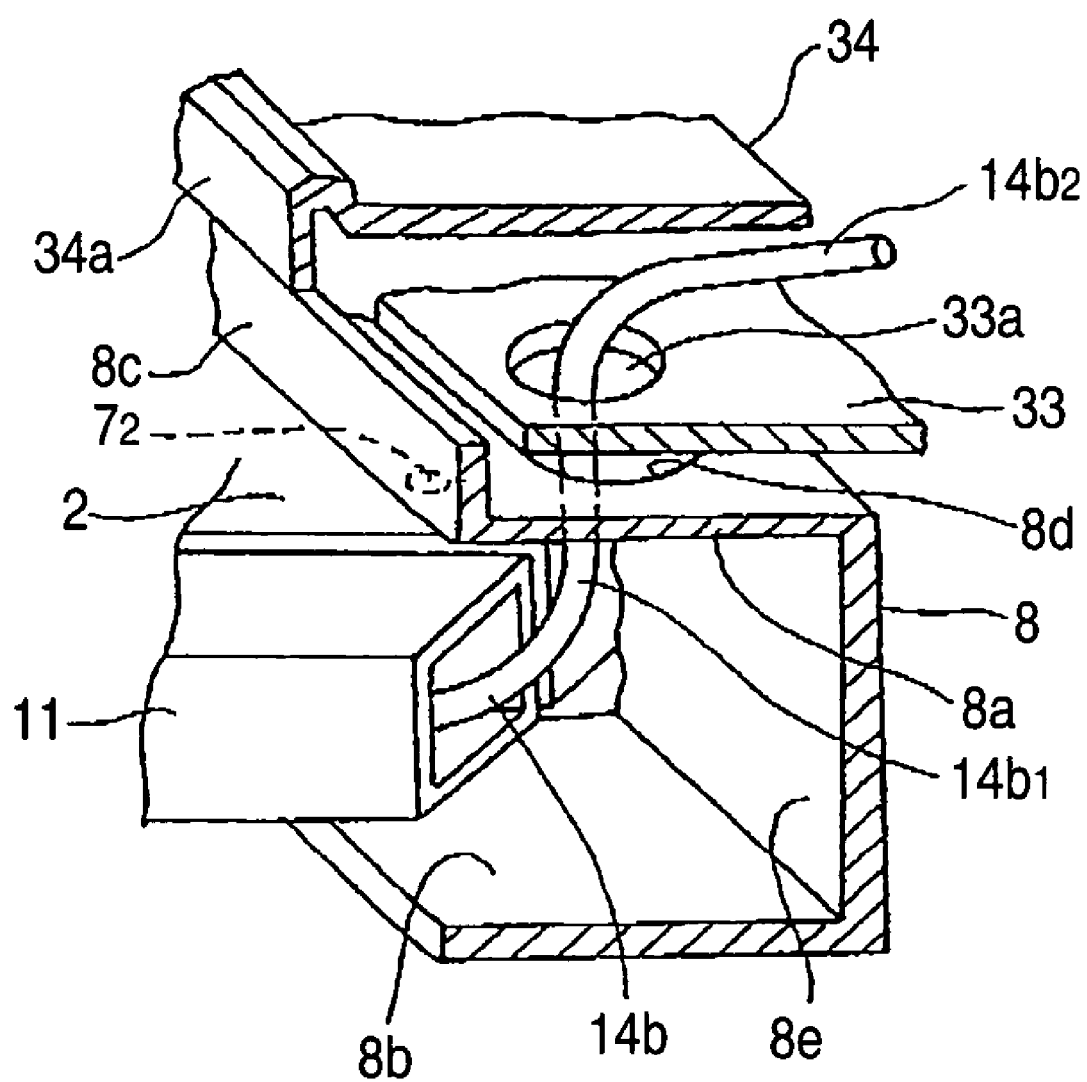
FIG. 3 is an exploded, perspective view showing an installation structure of a fixed body-side harness portion.

FIG. 3 shows the installation arrangement of the other side harness portion 14b (disposed at the vehicle body) in detail, and as shown in this Figure, the harness portion 14b passes through the distal open end of the slide protector 11, and further passes, as the vertically upwardly-extending portion $14b_1$, through the hole 8d in the rocker panel 8 and also through a hole 33a (disposed above the hole 8d) in a spacer plate 33, and is installed as the horizontal harness portion $14b_2$ in the vehicle body.

A scuff plate (step board) 34 is disposed above the spacer plate 33, and a flange 34a of the scuff plate 34 is engaged with a flange 8c of the rocker panel 8, and the horizontal harness portion $14b_2$ is installed in a gap between the scuff plate 34 and the spacer plate 33. The distal end portion of the slide protector 11 is disposed between an upper wall 8a and a lower wall 8b of the rocker panel 8, and the link arm 2 is disposed at the side of the slide protector 11, and the shaft portion 72 of the link arm 2 is disposed in the vicinity of the upwardly-extending portion $14b_1$ of the harness portion 14b.

If the other side harness portion 14b is not extended vertically upwardly, the other side harness portion 14b must be installed horizontally along a inner side wall 8e of the rocker panel 8 toward the front side of the vehicle. In this case, the horizontal harness portion must be bent between the distal end of the slide protector 11 and the rocker panel 8 to be directed forward, thereby forming a surplus length portion.

On the other hand, in this embodiment, the other side harness portion 14b is arranged to extend vertically upwardly in the vicinity of the shaft portion 72, and therefore a vehicle body-side surplus length portion does not need to be provided, and a space required for the bending of the surplus length portion is saved, and the degree of freedom of layout of the vehicle body-side parts and others is enhanced, and besides a protector (made of rubber or a synthetic resin) for covering the surplus length portion and the horizontal harness portion continuous therewith becomes unnecessary.

Furthermore, since the holes 8d and 33a are formed respectively through the upper wall 8a of the rocker panel 8 and the spacer plate 33, the upwardly-extending portion $14b_1$ of the other side harness portion 14b does not need to be confined in a narrow (low-height) space within the rocker panel 8, but can be made long, and therefore the twisting movement of the upwardly-extending portion $14b_1$ as well as the absorbing of a surplus length by this twisting movement, can be positively effected.

The slide protector 11 is longitudinally expanded when the door 1 is fully opened, and the slide protector 11 is compressed when the door 1 is fully closed. This operation is due to the fact that the slide protector 11 is disposed such that its axis is slightly offset forwardly from the axes of the shaft portions 7 of the link arm 2.

Figure 4:
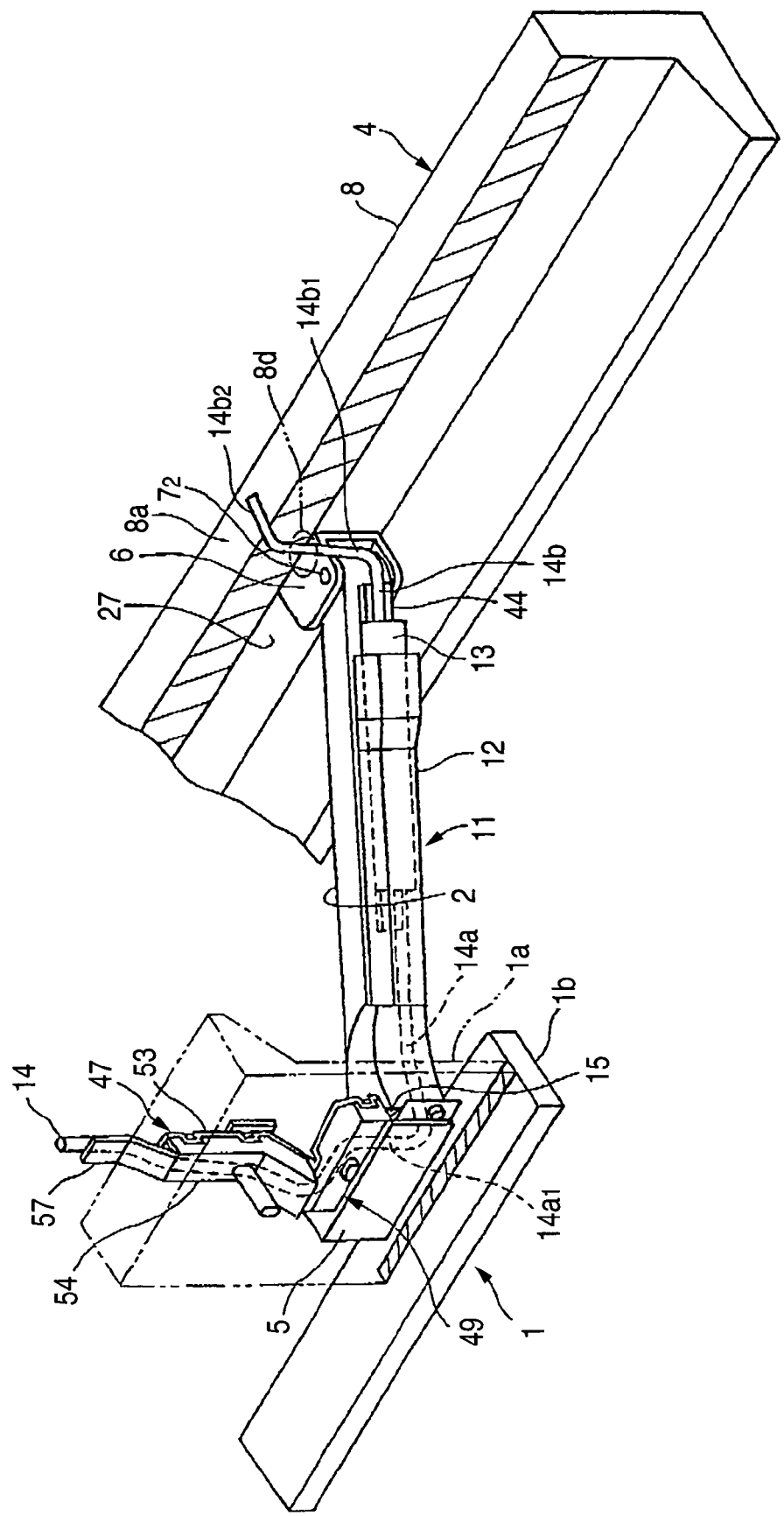
FIG. 4 is a perspective view showing a detailed example of a harness installation structure of a link-type movable body of the present invention in a fully-open condition of the movable body.
Figure 5:
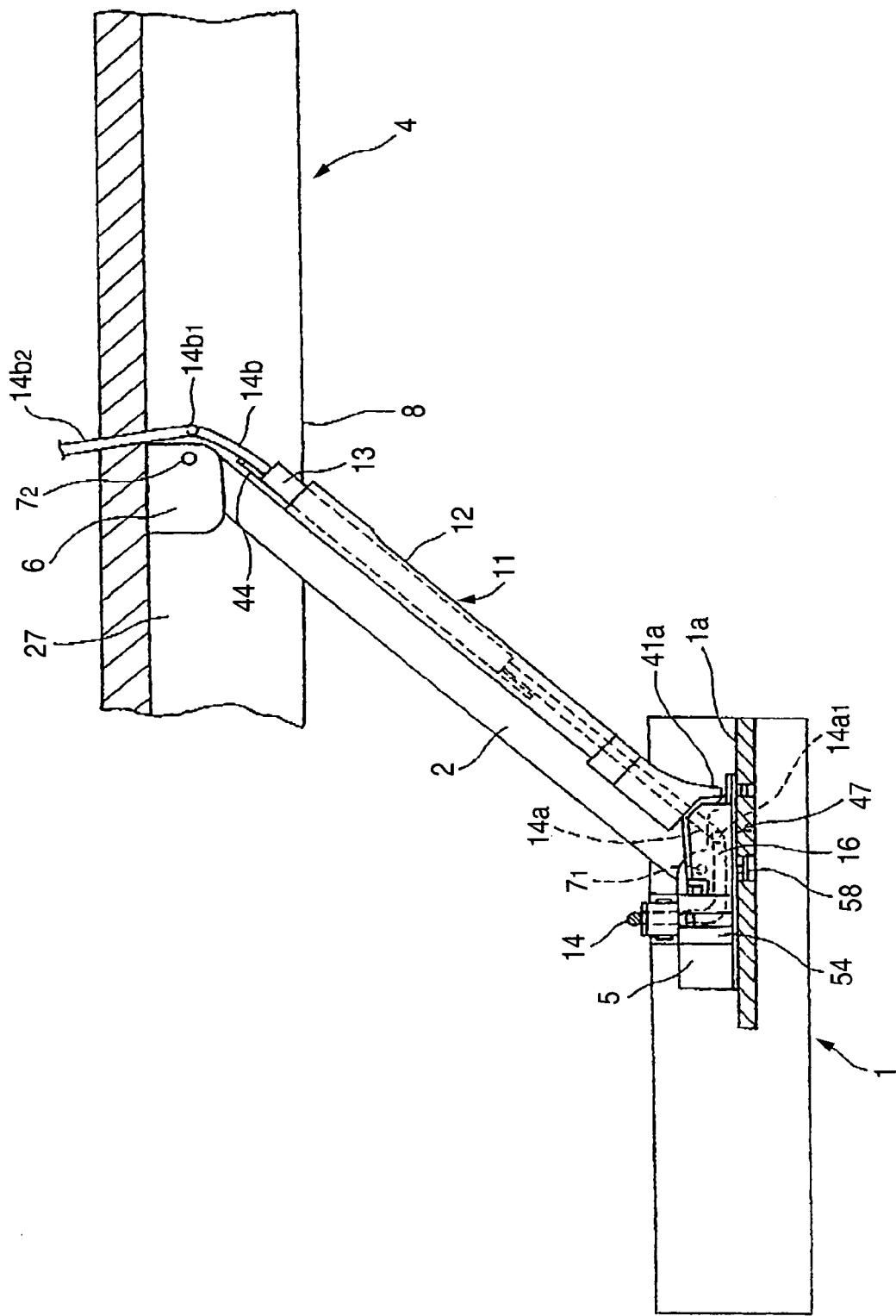
FIG. 5 is a plan view showing the harness installation structure of the link-type movable body in the fully-open condition of the movable body.
Figure 6:
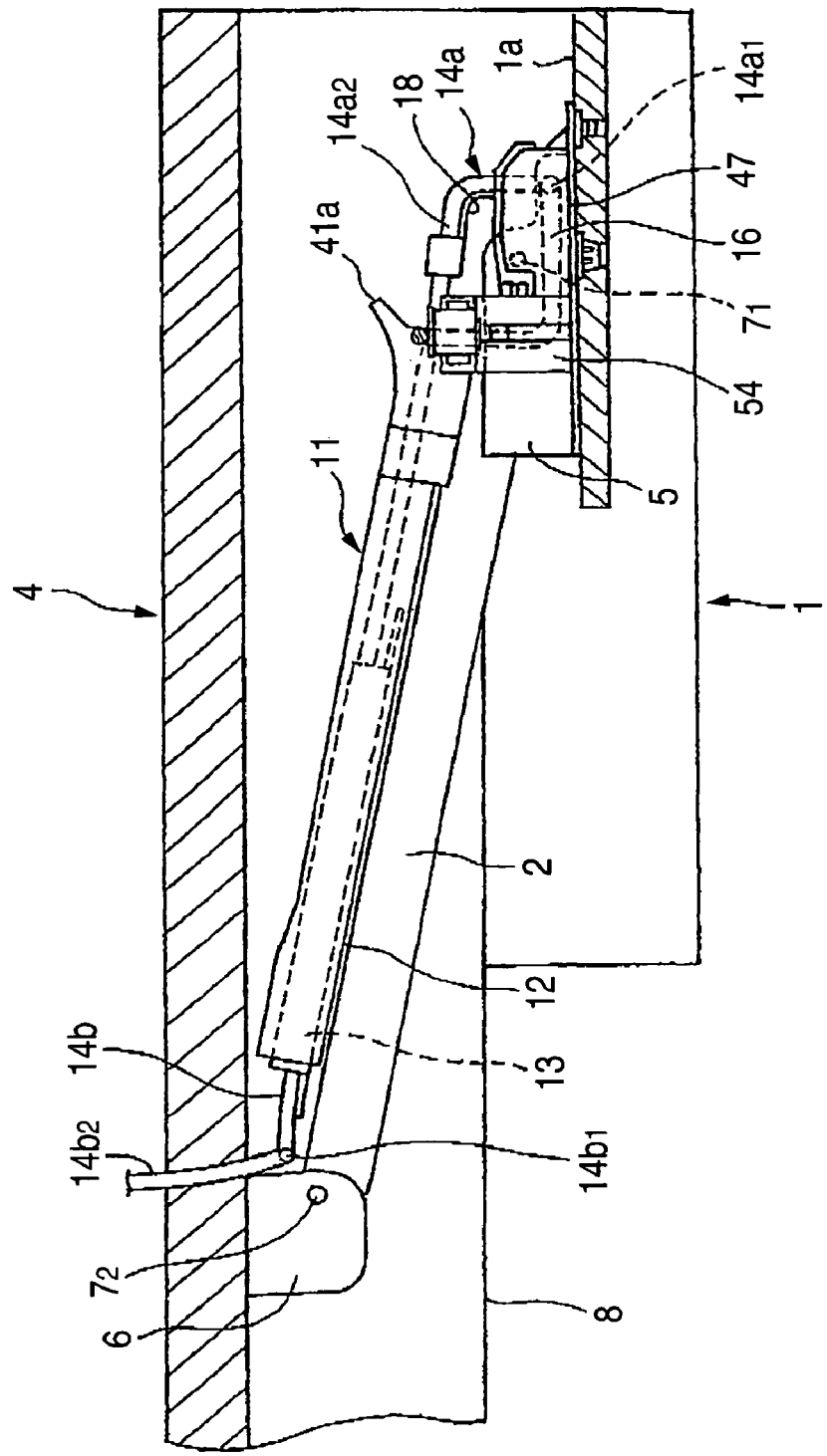
FIG. 6 is a plan view showing the harness installation structure of the link-type movable body in a fully-closed condition.

FIGS. 4 to 6 show a detailed example of a harness installation structure of a link-type movable body embodying the present invention. This detailed example is basically similar to the rough example of FIG. 1, and those portions similar in construction and operation to the corresponding portions of FIG. 1 will be designated by identical reference numerals, respectively, and detailed description thereof will be omitted.

FIG. 4 is a perspective view which shows a door fully-open condition, and is illustrated with the front and rear sides reversed with respect to FIG. 1. FIG. 5 is a plan view showing the door fully-open condition. A rocker panel 8 of a vehicle body (fixed body) 4 has a generally recumbent U-shaped cross-section, and extends horizontally. An inner panel 1a (part of which is shown) of a door (movable body) extends vertically upwardly from a bottom portion 1b of the door.

One side harness portion 14a of a wire harness 14 is led out of a proximal open end of a slide protector 11, and is swingably fixed at a protector portion 15 on the door 1, and extends upwardly so as to be twisted in its peripheral direction (This upwardly-extending portion is designated by reference numeral $14a_1$.), and is installed along the inner panel 1a. As shown in FIG. 5, the upwardly-extending portion $14a_1$ is disposed in the vicinity of a shaft portion $7_1$ of a link arm 2. A door trim (not shown) is attached to the inner panel 1a, and the protector portion 15 is disposed between the inner panel 1a and the door trim.

The other side harness portion 4b of the wire harness 14 is led out of a distal open end of the slide protector 11, and extends upwardly so as to be twisted in its peripheral direction (This upwardly-extending portion is designated by reference numeral $14b_1$.), and passes through a hole 8d in an upper wall 8a of the rocker panel 8, and is installed as a horizontal harness portion $14b_2$ on the vehicle body 4 while passing over the upper side of the rocker panel 8. Preferably, the other side harness portion 4b is also covered and protected by a synthetic resin-made protector (not shown) as is the case with the one side harness portion 4a.

The link arm 2 is pivotally connected to a pair of left and right link brackets 5 and 6 of a recumbent U-shaped cross-section, and one link bracket 5 is fixed to the door bottom portion 1b, while the other link bracket 6 is fixed to a groove portion 27 of the rocket panel 8.

The link arm 2 is formed into a rectangular tubular shape, using a metallic material of a high rigidity. The link arm 2 serves to support the door 1 on the vehicle body 4, and also serves to install the wire harness 14 from the vehicle body 4 to the door 1. The link arm 2 is pivotally supported on the link brackets 5 and 6 by respective shaft portions 7. The distance between the two shaft portions in the longitudinal direction of the link arm 2 is constant. The angle of opening/closing of the link arm 2 is, for example, about 120 degrees.

The slide protector 11 is mounted on a front side surface of the link arm 2. Incidentally, in the case where a space is formed at the rear side of the link arm 2 when the link arm 2 is turned forward, the slide protector 11 can be mounted on a rear side surface of the link arm 2. In this case, also, the one side harness portion 14a and the other side harness portion 14b of the wire harness 14 extend vertically upwardly in the vicinities of the shaft portions 7, respectively. If there is no problem with a space, the slide protector 11 can be mounted on an upper side surface of the link arm 2, and the one side and other side harness portions 14a and 14b can be arranged to extend vertically upwardly respectively in the vicinities of the shaft portions 7 or coaxially respectively with the shaft portions 7.

Figure 7:
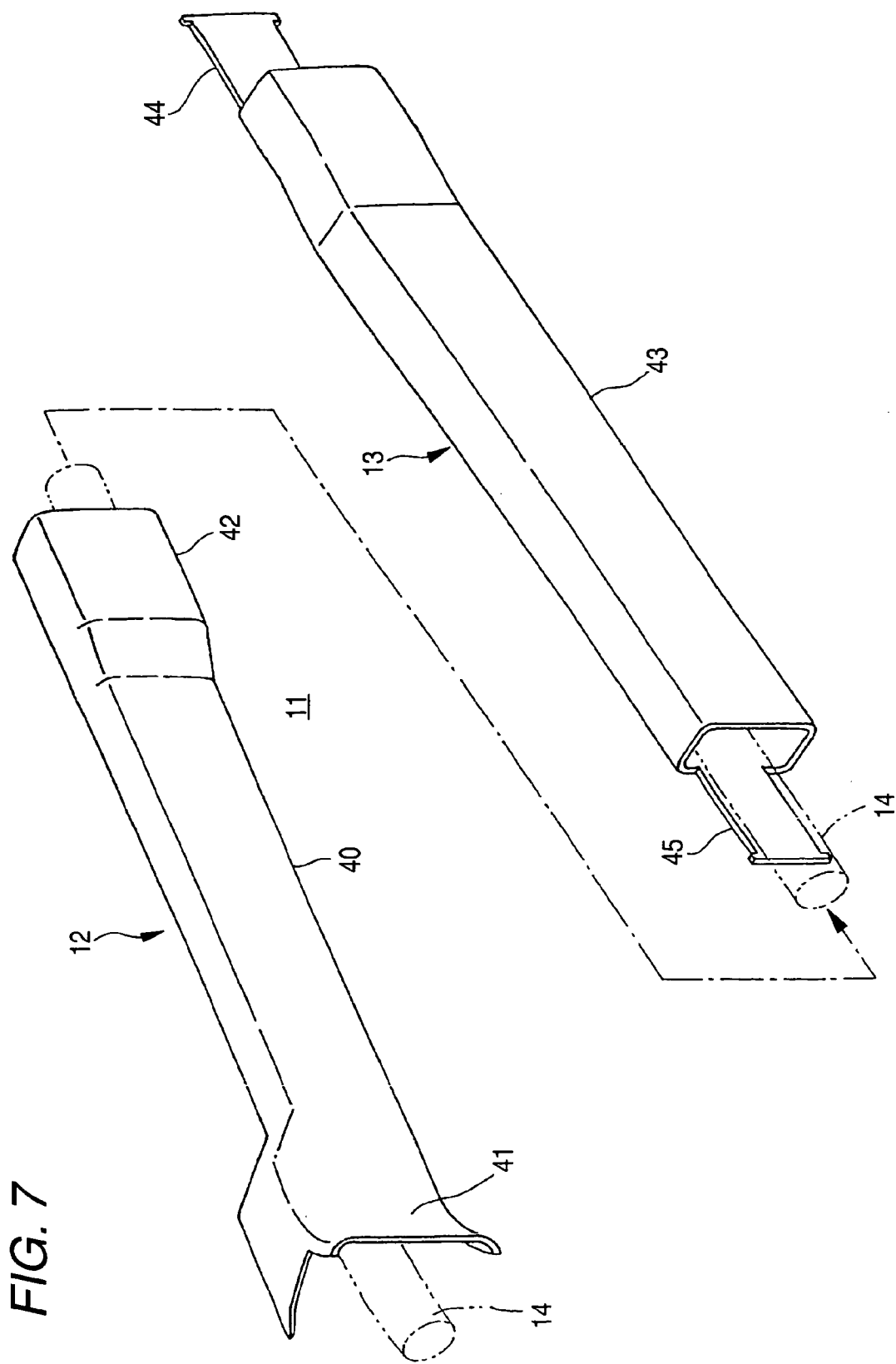
FIG. 7 is an exploded, perspective view showing one example of a slide protector used in the harness installation structure.

FIG. 7 shows one form of synthetic resin-made slide protector 11 comprising an outer protector 12 and an inner protector 13. The outer protector 12 includes a rectangular tubular portion 40, a curved guide portion 41 formed at a (door-side) distal end thereof, and a larger-width portion 42 formed at a proximal end thereof for the purpose of introducing the inner protector. The inner protector 13 includes a rectangular tubular portion 43, a harness fixing plate 44 formed at a (vehicle body-side) distal end thereof, and a harness fixing plate 45 formed at a proximal end thereof. The wire harness 14 is fixed to the two fixing plates 44 and 45, for example, by winding a tape. The wire harness 14 is not fixed to the outer protector 12.

The outer protector 12 is fixed to the link arm 2, for example, by retaining clips formed integrally with the outer protector 12, and the inner protector 13 can move back and forth within the outer protector in the longitudinal direction of the link arm 2. The retaining clip (not show) is of the known type, and has a pair of inclined claws formed at a distal end of a support post thereof, and the claws are engaged in a hole in the link arm. Although the length of the inner protector 13 relative to the length of the outer protector 12 can be suitably determined, it is preferred that the two protectors 12 and 13 have generally the same length or that the inner protector 13 is slightly longer than the outer protector 12 so that the sliding movement can be effected smoothly. In the illustrated embodiment of FIGS. 4 to 6, the inner protector 13 is shorter than the outer protector 12.

In FIGS. 4 and 5, the one side harness portion 14a, led out of the slide protector 11 toward the door, is horizontally fixed to a fixing plate formed at a distal end of a flexible plate portion 18 (FIG. 6) of a protector 47, for example, by winding a tape, and extends generally vertically upwardly within the protector 47 (The upwardly-extending portion is designated by reference numeral $14a_1$.), and further extends rearward horizontally along the protector 47, and then extends vertically upwardly, and is installed on the door inner panel 1a.

The protector 47 includes a protector body formed by the vertically-disposed flexible plate portion 18 (FIG. 6) (projecting toward the vehicle body 4) and a trough-like portion 49 of a generally crank-shape continuous with the flexible plate portion 18, and a plate-like cover 53 which covers a harness passage opening of the trough-like portion 49 and is retained on the trough-like portion 49 by retaining means. The trough-like portion 49 includes upper and lower vertical portions (vertical protector portions) 54 and 15, and an intermediate horizontal portion (horizontal protector portion) 16. The upper vertical portion 54 is continuous with the horizontal portion 16 through an inclined portion, and the flexible plate portion 18 is continuous with an inner side wall of the lower vertical portion 15 to be disposed generally flush therewith.

The wire harness 14 (FIG. 5) is fixed to a fixing plate 57 continuous with the upper vertical portion 54, for example, by winding a tape, and the relevant portion of the wire harness is waterproofed by an elastic through-less grommet 17 (FIG. 1) fitted in a groove portion in the door inner panel 1a. The cover 53 covers an opening of the intermediate horizontal portion 16 and an opening of the upper vertical portion 54, and retains the wire harness 14 within the trough-like portion 49. The protector 47 is a through-less protector which is surface-mounted on the door inner panel 1a.

The intermediate horizontal portion 16 of the protector 47 is disposed on the upper surface of the link bracket 5, and is fixed to the door inner panel 1a by a retaining clip 58. The rower vertical portion 15 is disposed at the inner side of the link bracket 5, and extends along the link arm 2 at a position slightly forwardly of the shaft portion $7_1$ of the link arm 2 (that is, in the vicinity of the shaft portion $7_1$). The upper vertical portion 54 extends vertically upwardly above the link bracket 5.

The protector 47 of FIG. 4 is formed into an integral construction, using a synthetic resin. However, the protector 47 can be formed, for example, into a construction in which the lower vertical portion 15 and the intermediate horizontal portion 16 are formed integrally with each other to form a first protector body, and a separate second protector body serving as the upper vertical portion 54 is connected to or combined with the intermediate horizontal portion 16.

As the protector (not shown) for covering the other side harness portion 14b of the wire harness at the vehicle body, there can be used, for example, a protector of a generally L-shape including a vertical protector portion for covering the upwardly-extending portion $14b_1$ of the harness portion 14b, and a horizontal protector portion (extending from this vertical protector portion) for covering the horizontal harness portion $14b_2$ continuous with the upwardly-extending portion $14b_1$. Preferably, the protector is fixed, for example, to the rocker panel 8 by a retaining clip or the like, and the vertical protector portion passes through the hole 8d in the rocker panel 8 and also through a hole 33a in a spacer plate (FIG. 3). The protector can be formed such that the vertical and horizontal protector portions are separate from each other.

When the door is fully opened as shown in FIG. 5, the wire harness 14, while fixed by the door-side protector 47, is supported in a forwardly-swung condition by the flexible plate portion 18 of the protector 47, and is installed obliquely forwardly straight along the link arm 2 by the slide protector 11, and that portion of the wire harness 14 extending from the slide protector 11 to the rocker panel 8 is smoothly curved with a large radius of curvature (bending). The wire harness 14 is pulled toward the rocker panel 8, with the swinging protector (29) serving as a supporting point, so that the slide protector 11 is longitudinally expanded long.

When the door 1 is closed forwardly from its fully-open condition of FIG. 5 as shown in FIG. 6, the one side harness portion 14a of the wire harness 14, while fixed by the door-side protector 47, is supported in a rearwardly-swung condition by the flexible plate portion 18 of the protector 47 at a position disposed forwardly of the shaft portion 7, and the horizontal harness portion $14a_2$ is bent in an outwardly-detouring condition, and the wire harness 14 within the slide protector 11 extends obliquely rearwardly along the link arm 2.

The horizontal harness portion $14a_2$ detours outwardly, and the distal end 41a of the outer protector 12 moves away from the upwardly-extending harness portion $14a_1$, and also the inner protector 13 moves nearer to the swinging protector (29) serving as the rocker panel-side fixing (supporting) point than in the door fully-opened condition of FIG. 5, so that the wire harness 14 is compressed between the swinging protector (29) and the inner protector 13 in the longitudinal direction, and the inner protector 13 is inserted deeper into the outer protector 12; so that the slide protector 11 is shortened, and the upwardly-extending portion 14a, is twisted in its peripheral direction, thereby absorbing the pivotal displacement of the link arm 2.

When the link arm 2 is turned forwardly, the upwardly-extending portion $14b_1$ of the other side harness portion 14b at the vehicle body is twisted in its peripheral direction as described above for the one side harness portion 14a, thereby absorbing the pivotal displacement of the link arm 2. The upwardly-extending portions $14a_1$ and $14b_1$ are disposed respectively in the vicinities of the left and right shaft portions $7_1$ and $7_2$ of the link arm 2, and the distance between the upwardly-extending portion $14a_1$ and the shaft portion $7_1$, as well as the distance between the upwardly-extending portion $14b_1$ and the shaft portion $7_2$, is small, and therefore the axes of pivotal movement of the link arm 2 generally coincide respectively with the axes of pivotal movement of the wire harness 14, and a bending action will not develop in the wire harness 14 (Only the twisting movement in the peripheral direction is required.).

During the time when the door is moved from its fully-closed condition of FIG. 6 to its fully-open condition of FIG. 5, the door-side horizontal detour portion of the wire harness 14 is extended or expanded, and the distal end 41a of the outer protector 12 approaches the upwardly-extending harness portion $14a_1$, and also the slide protector 11 moves away from the swinging protector (29) serving as the vehicle body-side harness fixing point. As a result, the wire harness 14 is drawn out of the slide protector 11 toward the vehicle body, and the upwardly-extending portions $14a_1$ and $14b_1$ of the two harness portions 14a and 14b of the wire harness 14 are twisted respectively in directions reverses to the twisting directions of FIG. 6 (that is, the twisted conditions are canceled), thereby absorbing the pivotal movement of the link arm 2.

The other side harness portion 14b at the vehicle body extends upwardly immediately adjacent to the shaft portion $7_2$ of the link arm 2, and the inner protector 13 of the slide protector 11 slides (to effect the longitudinal expansion and contraction), thereby always holding the upwardly-extending portion $14b_1$ in the predetermined position near to the shaft portion $7_2$, and therefore it is not necessary to provide a flexible plate portion such as the flexible plate portion 18 of the protector 47 for the one side harness portion 14a.

The one side harness portion 14a is fixed at the door side, and is swingably supported by the flexible plate portion 18, and the upwardly-extending portions $14a_1$ and $14b_1$ of the two harness portions 14a and 14b can be twisted in the peripheral direction respectively in the vicinities of the shaft portion $7_1$ and $7_2$, while absorbing axis offset between the link arm 2 and the slide protector 11. Therefore, a surplus length portion of the wire harness 14 does not need to be provided, and a management point for the surplus length portion is eliminated, and therefore the design, management, etc., required for positively effecting the continuous power supply, are facilitated, and the reliability of the continuous power supply is enhanced. And besides, a space required for a bending movement of the surplus length portion becomes unnecessary, so that the door-side and vehicle body-side harness installation portions can have a space-saving design, and furthermore the lowering of a bending durability of the wire harness 14 due to repeated bending movements of the surplus length portion is prevented.

Figure 8:
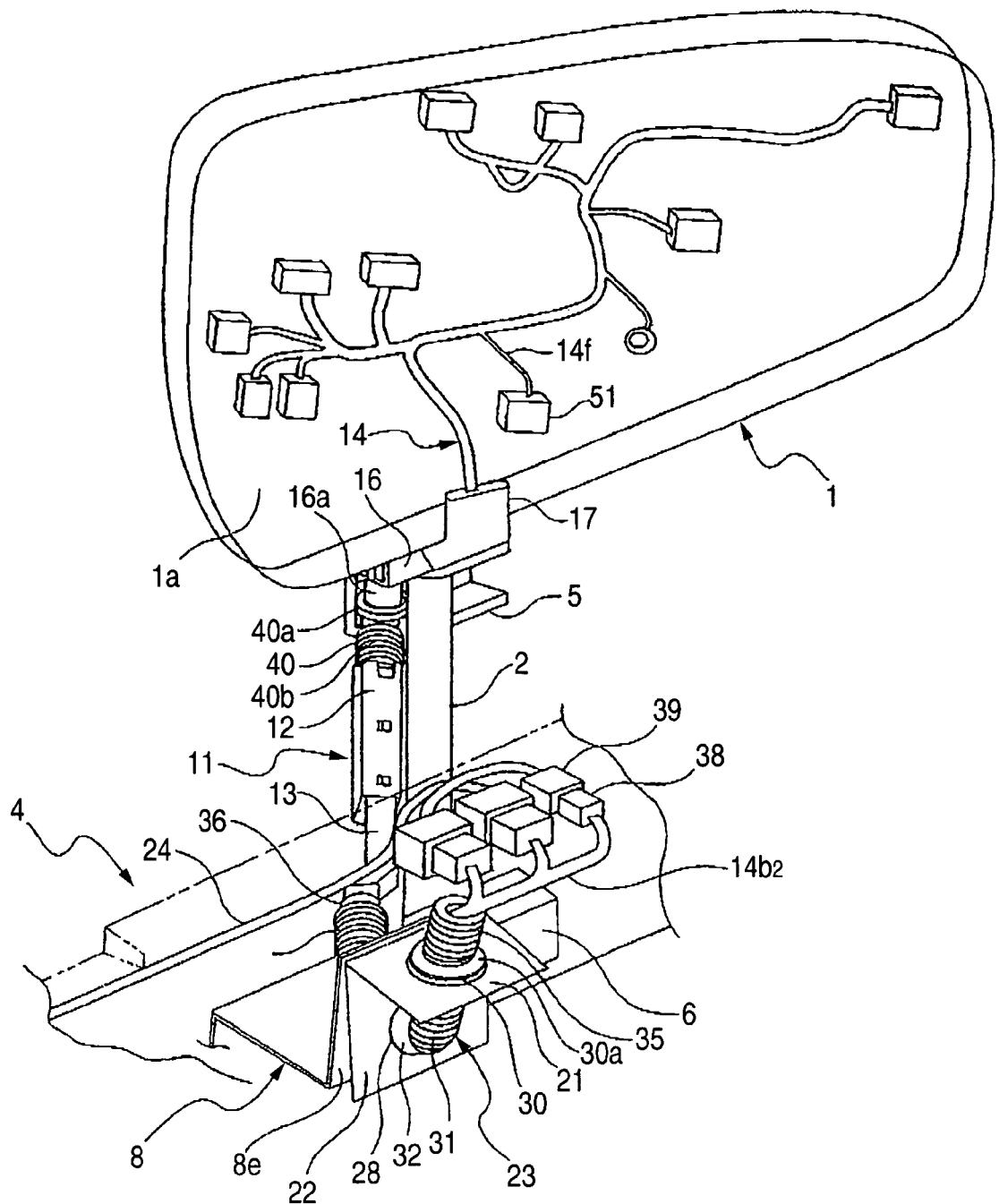
FIG. 8 is a perspective view showing a harness installation structure of a link-type movable body provided in accordance with a second embodiment of the invention.
Figure 9:
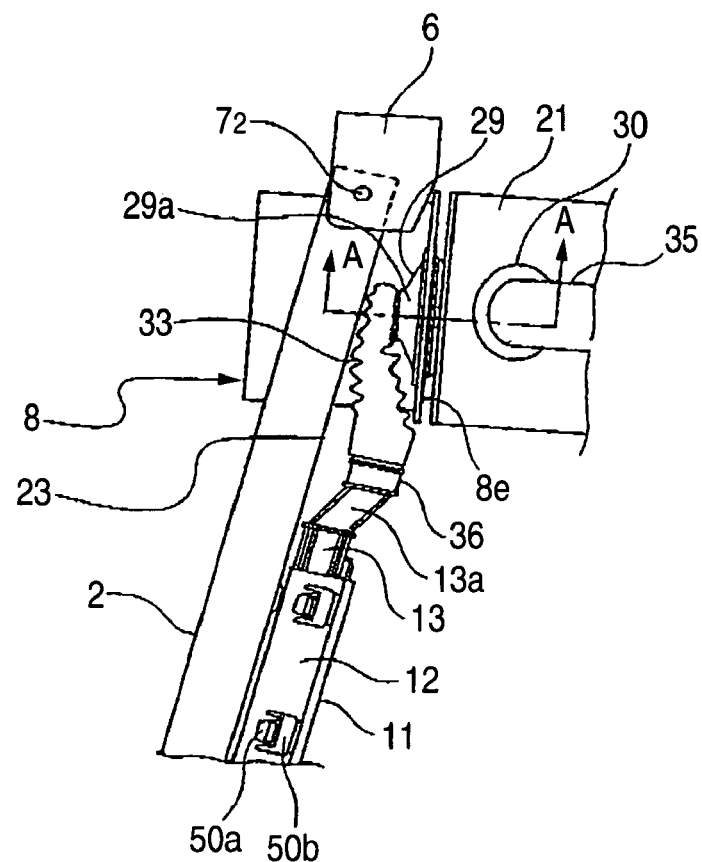
FIG. 9 is a plan view showing an important portion of a vehicle body-side portion of the harness installation structure.
Figure 10:
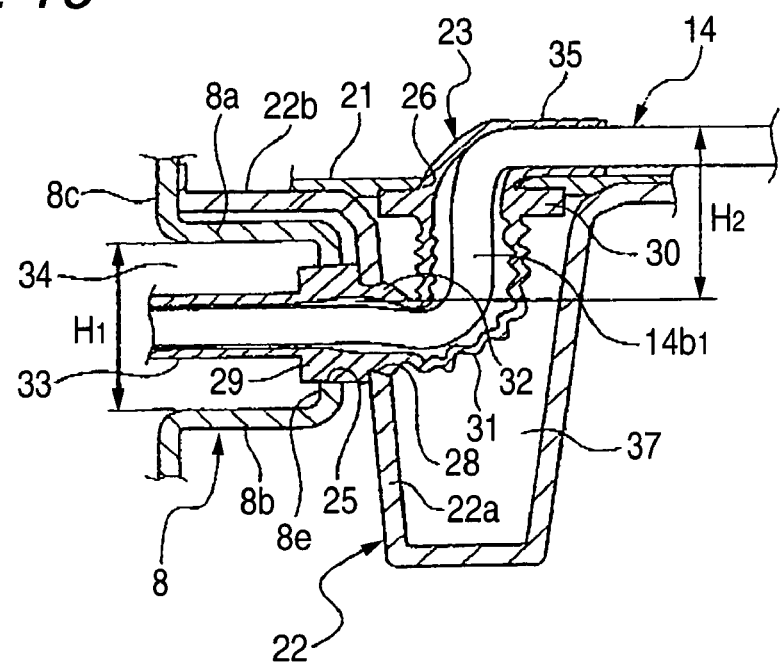
FIG. 10 is a cross-sectional view taken along the line A-A of FIG. 9.
Figure 11:
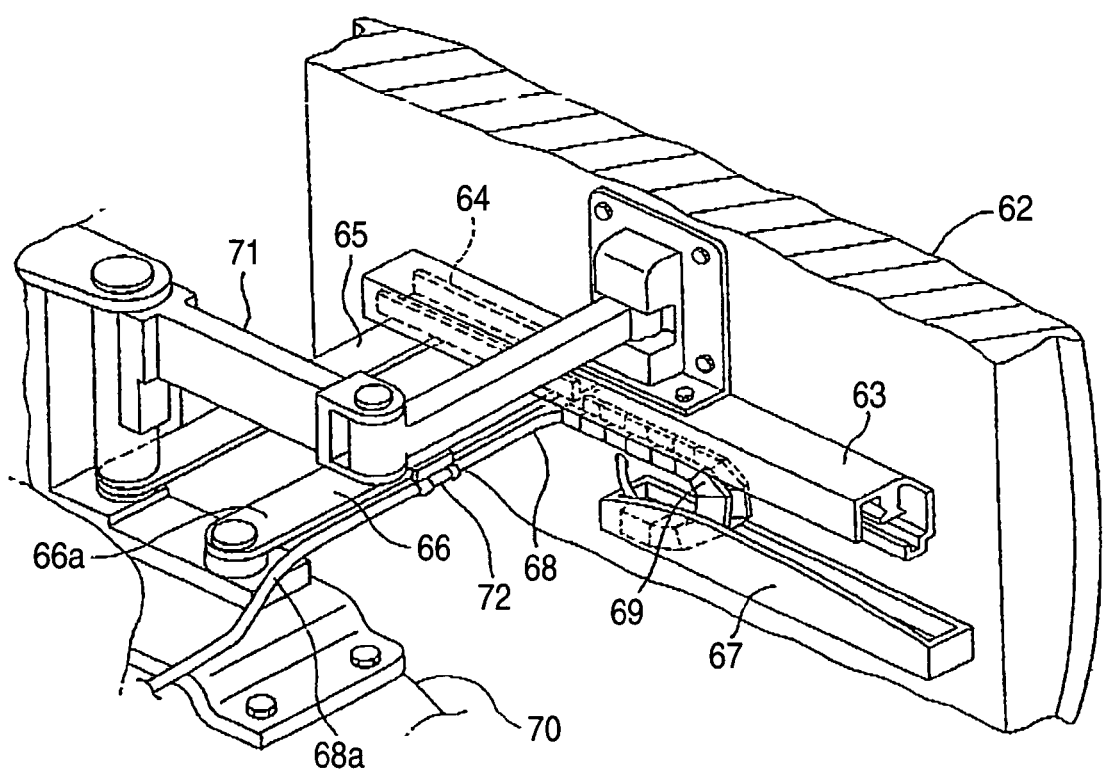
FIG. 11 is a perspective view showing one example of a related harness installation structure of a link-type movable body.

FIGS. 8 to 10 show a harness installation structure of a link-type movable body provided in accordance with a second embodiment of the invention. FIG. 8 shows a fully-open condition of a link-type door of an automobile, FIG. 9 shows a fully-closed condition of the door, and FIG. 10 is a cross-sectional view taken along the line A-A of FIG. 9. Those constituent portions similar to those of the first embodiment will be designated by identical reference numerals, respectively, and detail explanation thereof will be omitted.

In this harness installation structure, a wire harness 14 is installed to pass horizontally through a side wall 8e of a metallic rocker panel (rocker inner panel) 8 provided at a vehicle body 4 and also to pass vertically through a horizontal metallic floor panel 21.

A (elastic) waterproof grommet 23 made of synthetic rubber is provided to extend through the rocker panel 8 and the floor panel 21 in such a manner that this grommet 23 is bent into a generally L-shape or crank-shape. One end of the waterproof grommet 23 is connected to a slide protector 11 provided at a link arm 2, and the wire harness 14 passes through the slide protector 11, and further passes the waterproof grommets 23, and is connected by connectors to a floor wire harness 24 over the floor panel 21.

Round holes 25 and 26 are formed respectively through the rocker panel 8 and the floor panel 21. Annular larger-diameter fitting portions 29 and 30 of the waterproof grommet 23 are closely fitted or engaged in the holes 25 and 26, respectively. A metallic rocker lean hose 22 for reinforcing purposes is provided adjacent to the outer side of the rocker panel 8, and a hole 28 is formed through a side wall 22a of the rocker lean hose 22, and is disposed in opposed relation to the hole 25 in the side wall 8e of the rocker panel 8. The waterproof grommet 23 includes an intermediate bellows portion 31 extending from the fitting portion 29, and an annular portion 32 of a larger thickness, formed at a proximal end of this bellows portion 31, is closely fitted in the hole 28. Reference numeral 8 in the above embodiment (FIG. 3) denotes the rocker panel.

The rocker panel 8 of this embodiment also has a recumbent U-shaped cross-section as in the embodiment of FIG. 3, and extends in a longitudinal direction of a vehicle body as shown in FIG. 8. A one-side bellows portion 33 of the waterproof grommet 23 is disposed horizontally within a space 34 formed between upper and lower walls 8a and 8b of the rocker panel 8, and a link bracket 6 is disposed within the space 34, and the link arm 2 is supported by a shaft portion 72 (FIG. 9) so as to be pivotally (swingably) moved horizontally.

The hole 25 is formed through the vertical side wall 8e of the rocker panel 8, and is disposed in the vicinity of the shaft portion 72, and one fitting portion 29 of the waterproof grommet 23 is fixedly fitted in this hole 25. The fitting portion 29 includes a cup-like portion 29a (FIG. 9) of a larger diameter, and an annular portion 32 of a slightly smaller diameter extending from the cup-like portion 29a. A peripheral edge portion of the hole 25 in the side wall 8e of the rocker panel 8A is engaged in the peripheral groove formed in the cup-like portion 29a, and an outer peripheral edge portion of the cup-like portion 29a is held in intimate contact with an outer surface (FIG. 9) of the side wall 8e, and the annular portion 32 is closely fitted in the hole 28 formed through the vertical side wall 22a of the rocker lean hose 22.

For mounting the waterproof grommet 23, this grommet 23 is inserted from the door side (the outside) sequentially into the hole 25 of the rocker panel 8 and the hole 28 of the rocker lean hose 22, and then is inserted into the hole 26 of the upper-side horizontal floor panel 21 from the lower side thereof, so that the other fitting portion 30 is fitted in the hole 26.

As shown in FIG. 8, the other fitting portion 30 has a cup-like portion 30a and a peripheral groove which are generally similar respectively to those of the one fitting portion 29. The cup-like portion 30a is forced through the hole 26 of the floor panel 21 from the lower side, and a peripheral edge portion of the hole 26 is engaged in the peripheral groove, and an outer peripheral edge portion of the cup-like portion 30a is held in intimate contact with the upper surface of the floor panel 21. In FIGS. 9 and 10, the other fitting portion 30 is shown in a simplified manner.

The flexible bellows portion 31 is formed integrally with and extends between the two fitting portions 29 and 30, and is bent into a generally L-shape, and similar bellows portions 33 and 35 are formed integrally with and extend respectively from the fitting portions 29 and 30 to the opposite ends of the grommet 23. A portion 36 which is to be connected to a movable inner protector 13 of the slide protector 11 is formed integrally at a distal end of the rocker panel (8)-side bellows portion 33. A flexible half-split portion (not shown) (to which a led-out portion of the wire harness 14 is to be fixed by winding a tape or other means) is provided at a distal end of the floor panel-side bellows portion 35.

When the door is fully opened as shown in FIG. 8, the bellows portion 33 of the waterproof grommet 23 is expanded generally straight along (that is, in contiguous relation to) the link arm 2 at a region between the slide protector 11 and the rocker panel 8. When the door is fully closed as shown in FIG. 9, the bellows portion 33 is flexibly bent along the link arm 2 in the vicinity of the fitting portion 29. The floor panel-side bellows portion 35 is bent to extend horizontally along the floor panel 21 as shown in FIG. 10. Within the waterproof grommet 23, the wire harness 14 is bent together with the bellows portions 31, 33 and 35. As shown in FIG. 10, the intermediate bellows portion 31 is bent, together with the wire harness 14, into a generally L-shape, and the floor panel-side bellows portion 35 is bent into a generally inverted L-shape, so that the installed wire harness 14 is bent in a generally crank-shape.

As shown in FIG. 10, the intermediate bellows portion 31 is received within an internal space 37 (having a generally channel-shaped cross-section) of the rocker lean hose 22, and is introduced into a passenger compartment through the hole 26 in the floor panel 21 closing an upper opening of the rocker lean hose 22. An upper horizontal wall 22b of the rocker lean hose 22 is fixed to a vertical wall 8c of the rocker panel 8 extending from the upper wall 8a thereof.

The wire harness 14 is installed in such a manner that its upwardly-extending portion 14b, is not limited by a height $H_1$ of the rocker panel 8, but has a sufficient height $H_2$ to be able to be twisted in its peripheral direction. With this arrangement, a surplus length of the wire harness 14, developing when the door 1 is opened and closed, is smoothly and positively absorbed by the twisting movement of the upwardly-extending portion $14b_1$. Naturally, the length of the wire harness 14 is reduced when the upwardly-extending portion $14b_1$ is twisted, and the length of the wire harness 14 is increased when this twisted condition is canceled. When the door 1 is fully closed, the upwardly-extending portion $14b_1$ is twisted to a maximum degree, thereby absorbing the surplus length.

As shown in FIG. 8, a wire harness portion $14b_2$ led out of the floor panel-side bellows portion 35 is divided into a plurality of wires, and these wires are connected respectively to connectors 39 of the floor wire harness 24 via respective connectors 38. The floor wire harness 24 is installed over the floor panel 21, and is connected to a power source (battery).

In the slide protector 11 of this embodiment, the inner protector 13 is longer than an outer protector 12 as shown in FIG. 8, and one end portion (slanting portion) 13a of the inner protector 13 is connected to the vehicle body-side waterproof grommet 23, and is fixed thereto by a band or the like, while the other end portion of the inner protector 13 is connected to a door-side waterproof grommet 40.

The outer protector 12 as well as the inner protector 13 is formed into a divided type, and after the wire harness 14 is passed through the slide protector, division sections of each protector are combined and fixed together by retaining means (Only retaining projections 50a and retaining frame-like portions 50b of the outer protector 12 are shown in FIG. 9.). The inner protector 13 is engaged in the outer protector 12 so as to slide in the longitudinal direction. The outer protector 12 is fixed to a front side surface of the link arm 2. The wire harness 14 is fixed to the inner protector 13.

As shown in FIG. 8, the door-side waterproof grommet 40 extends vertically upwardly from the slide protector 11 in such a manner that this grommet 40 is bent into a generally L-shape. A vertical portion 40a of this grommet extending from a horizontal bellows portion 40b thereof is connected to a vertical portion 16a of a door-side protector 16 at a lower end portion of a door inner panel 1a so as to be angularly moved in its peripheral direction. A horizontal portion of the protector 16 is connected to a second door-side waterproof grommet (through-less grommet) 17.

The wire harness 14 led out of the slide protector 11 passes through the door-side waterproof grommet 40, the protector 16 and the second grommet 17, and then is installed within the door 1, and branch wires 14f are connected respectively to door-side auxiliary equipments (not shown) via connectors 51 provided respectively at distal ends thereof. Examples of such auxiliary equipments include a power window motor, a door lock, a speaker, a courtesy lamp and a switch unit.

At the door-side region, the wire harness 14 extends upwardly within the vertical portion 40a of the waterproof grommet 40 and the vertical portion 16a of the protector 16, and this upwardly-extending portion (which is similar to the upwardly-extending portion 14a, of FIG. 1) is twisted in its peripheral direction when the door 1 is opened and closed.

In FIG. 8, reference numeral 5 denotes a door-side link bracket. The other end of the link arm 2 is pivotally supported on the link bracket 5 of a generally recumbent U-shaped cross-section by a shaft portion 71 (see FIG. 1). The link brackets 5 and 6 are short.

In this embodiment, although the single link arm 2 is used, two parallel link arms can be used, in which case longer link brackets 5 and 6 are used, and the link arms are pivotally supported by shaft portions 7 so as to move in parallel relation to each other. The two link arms and the two link brackets jointly form a four-link mechanism.

In the above embodiment, although the slide protector 11 is used, for example, the provision of the slide protector 11 can be omitted, and the wire harness 14 can be received in a bent condition (e.g. in a corrugated condition) within one protector of a rectangular tubular shape so that the thus bent wire harness can replace the slide protector 11 which can be expanded and contracted. In this case, when the door 1 is fully opened, the wire harness 14 is extended straight within the protector, and when the door 1 is fully closed, the wire harness 14 is bent in a corrugated, spiral or any other suitable form within the protector.

In the case where one protector is disposed on a straight line, interconnecting the axes of the shaft portions 7, at the upper wall of the link arm 2 or other portion, and also the axes (centers) of the two upwardly-extending portions $14a_1$ and $14b_1$ of the wire harness 14 coincide respectively with the axes of the two shaft portions 7, it is not necessary to longitudinally expand and contract the wire harness within the protector, and it is only necessary to install and fix the wire harness straight. In this case, the provision of the protector can be omitted, and the wire harness 14 can be installed along the link arm 2. However, it is preferred to use the protector from the viewpoint of protection of the wire harness 14.

In the above embodiment, the slide protector 11 comprises the outer protector 12, and the inner protector 13 which is engaged in the outer protector so that the slide protector can be longitudinally expanded and contracted. However, for example, there can be used a construction in which a rail (not shown) is provided along the link arm 2, and one tubular slide protector is slidably engaged with the rail, and the wire harness 14 is passed through this slide protector, and is fixed thereto.

Furthermore, the door-side protector 47 can have any suitable shape in so far as it can firmly fix the wire harness without producing any surplus length portion. The flexible plate portion 18 of the protector 47 can be replaced by a flexible rod portion or any other suitable portion in so far as it supports the wire harness portion 14a (led out of the slide protector 11) horizontally or generally horizontally, and fixes the wire harness 14, and allows the upwardly-extending portion 14a₁ of the wire harness 14 to be twisted when the door is opened and closed.

Furthermore, the provision of the flexible plate portion 18 of the protector 47 can be omitted, and the upwardly-extending portion 14a₁ of the wire harness 14 can be supported within the protector so as to be twisted. In this case, for example, the upwardly-extending portion 14a₁ is received within a tubular vertical portion narrower than the vertical portion 15 of the protector 47, and the horizontal portion 14a₂ of the wire harness 14 (FIG. 6) continuous with the lower end of the upwardly-extending portion 14a₁ is led out toward the slide protector 11 through a narrow opening formed in the lower portion of the vertical portion 15 of the protector 47.

The structure of FIG. 1 can be modified into a construction in which as in the embodiment of FIG. 8, the provision of the flexible plate portion 18 is omitted, and the upwardly-extending portion 14a₁ is twisted within an L-shaped elastic grommet (not shown) (connected to the long inner protector 13 of the slide protector 11) and the vertical portion 15 of the protector 47 angularly movably connected to this grommet.

The above harness installation structure of the link-type movable body can be applied to other doors than the automotive link-type door such as a link-type door of an electric train, a locomotive or the like and a link-type door, a link-type cover, etc., of a processing machine, an inspection apparatus, etc. In this case, a vehicle body of the electric train, the locomotive or the like, a machine body of the processing machine and an apparatus body of the inspection apparatus or the like are called the fixed body.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-374688 filed on Dec. 27, 2005 and Japan Patent Application No. 2006-277163 filed on Oct. 11, 2006, the contents of which are incorporated herein for reference.

What is claimed is:

1. A harness installation structure, comprising:
   a link arm that pivotally supports a movable body to a fixed body;
   a wire harness that is installed to extend from the fixed body to the movable body along the link arm; and
   a protector that is provided on the link arm;
   wherein the wire harness has an upwardly-extending portion which is arranged to extend vertically upwardly at an end portion of the link arm;
   wherein the upwardly-extending portion is twisted about an axis of the upwardly-extending portion that is parallel to and alongside an axis of a shaft portion, provided on the end portion of the link arm for pivotally supporting the link arm, while the movable body is moved between an opened position and a closed position;
   wherein the wire harness passes through the protector;
   wherein the upwardly-extending portion is formed at a part of the wire harness drawn from an end of the protector;
   wherein the protector is a slide protector; and
   wherein expansion and contraction of the wire harness due to axis offset between the link arm and the slide protector are absorbed by expansion and contraction of the slide protector.

2. The harness installation structure according to claim 1, wherein the upwardly-extending portion of the wire harness passes through a hole formed in an upper wall of a panel provided at the fixed body.

3. The harness installation structure according to claim 1, wherein the wire harness passes through a hole formed in a side wall of a panel provided at the fixed body; and
   wherein the upwardly-extending portion of the wire harness passes through a hole formed in a floor panel.

4. The harness installation structure according to claim 3, further comprising waterproof grommets which are fitted in the hole of the panel and the hole of the floor panel, respectively; and
   wherein the upwardly-extending portion is installed within the waterproof grommet.

5. The harness installation structure according to claim 1, wherein the movable body is a door, and the fixed body is a vehicle body.

* * * * *